(12) United States Patent
Wu et al.

(10) Patent No.: US 10,826,314 B2
(45) Date of Patent: Nov. 3, 2020

(54) WIRELESS CHARGERS

(71) Applicant: Hewlett-Packard Development Company, L.P., Houston, TX (US)

(72) Inventors: Kuan-Ting Wu, Taichung (TW); Chienlung Yang, Houston, TX (US); Kun Chih Wang, Houston, TX (US)

( * ) Notice: Subject to any disclaimer, the term of this patent is extended or adjusted under 35 U.S.C. 154(b) by 6 days.

(21) Appl. No.: 15/520,253

(22) PCT Filed: Dec. 16, 2014

(86) PCT No.: PCT/US2014/070433
§ 371 (c)(1),
(2) Date: Apr. 19, 2017

(87) PCT Pub. No.: WO2016/099450
PCT Pub. Date: Jun. 23, 2016

(65) Prior Publication Data
US 2017/0310147 A1    Oct. 26, 2017

(51) Int. Cl.
*H02J 7/00* (2006.01)
*H02J 7/02* (2016.01)
*H02J 50/10* (2016.01)
*H02J 5/00* (2016.01)

(52) U.S. Cl.
CPC .............. *H02J 7/025* (2013.01); *H02J 5/005* (2013.01); *H02J 7/0042* (2013.01); *H02J 50/10* (2016.02)

(58) Field of Classification Search
CPC .................................................. H02J 7/0025
USPC ......................................................... 320/108
See application file for complete search history.

(56) References Cited

U.S. PATENT DOCUMENTS

| 6,291,969 | B1 * | 9/2001 | Kaneko | H02J 7/0004 320/108 |
|---|---|---|---|---|
| 2008/0197960 | A1 | 8/2008 | Hasegawa et al. | |
| 2011/0121920 | A1 | 5/2011 | Kurs | |
| 2012/0001496 | A1 * | 1/2012 | Yamamoto | H01F 27/2876 307/104 |
| 2013/0020877 | A1 | 1/2013 | Miller | |
| 2013/0099735 | A1 * | 4/2013 | Partovi | H01F 7/0252 320/108 |

(Continued)

FOREIGN PATENT DOCUMENTS

| CN | 103026436 | 4/2013 |
|---|---|---|
| CN | 203039391 | 7/2013 |
| CN | 203278291 | 11/2013 |

(Continued)

OTHER PUBLICATIONS

Waffenschmidt, Eberhard. "Wireless power for mobile devices." In Telecommunications Energy Conference (INTELEC), 2011 IEEE 33rd International, pp. 1-9. IEEE, 2011.

*Primary Examiner* — Samuel Berhanu
(74) *Attorney, Agent, or Firm* — International IP Law Group PLLC

(57) ABSTRACT

A wireless charger may include a transmitting coil to induce charging of a target device, a printed circuit board, a charger casing to include the transmitting coil and the printed circuit board, and a thermally conductive coating to dissipate heat. The transmitting coil may include at least one electrically conducting coil. The thermally conductive coating may be in direct contact with at least one of the transmitting coil, the printed circuit board, and the charger casing.

15 Claims, 3 Drawing Sheets

(56) References Cited

U.S. PATENT DOCUMENTS

2013/0163635 A1  6/2013  Karanth et al.
2014/0285967 A1  9/2014  Wikander et al.

FOREIGN PATENT DOCUMENTS

| CN | 103915905 | 7/2014 |
|---|---|---|
| EP | 2226819 | 9/2010 |
| JP | 2008087733 | 4/2008 |
| TW | 201429361 | 7/2014 |
| WO | WO-2010129369 | 11/2010 |
| WO | WO-2013103948 | 7/2013 |
| WO | WO-2014092300 | 6/2014 |

* cited by examiner

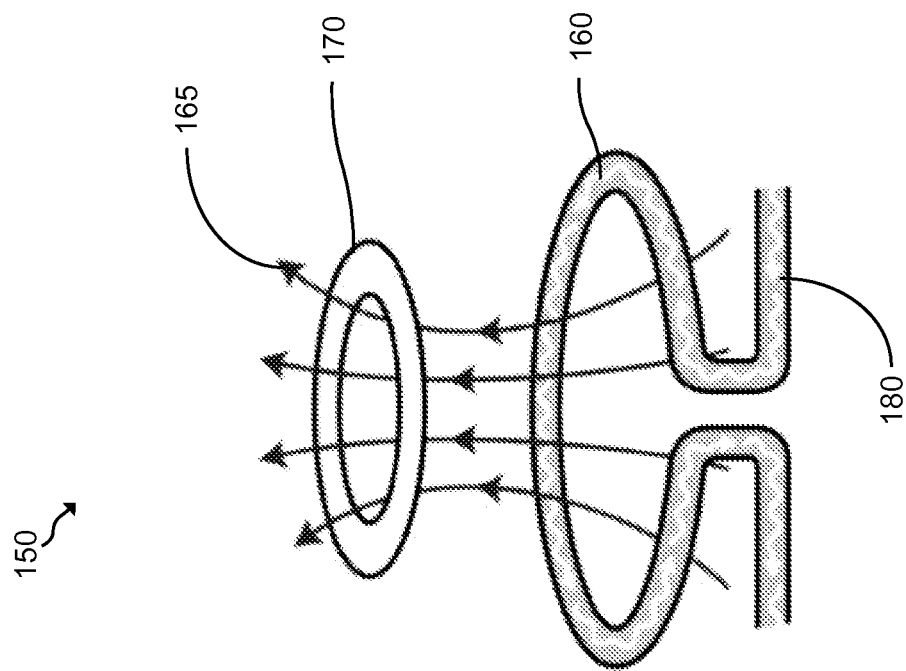
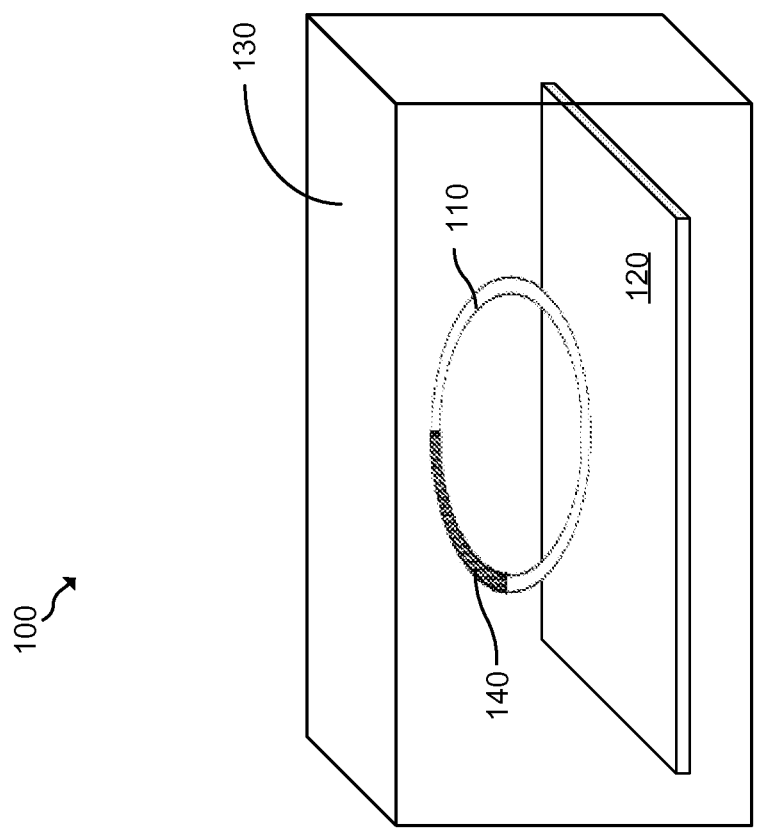
*FIG. 1B*
*FIG. 1A*

WIRELESS CHARGERS

BACKGROUND

Wireless charging uses electromagnetic fields to transfer energy between two objects. Wireless charging usually involves a charger or charging station, from which energy is sent through an inductive coupling to a target electrical device. The target device can then use that energy to charge batteries or to power the device. Wireless charging may be used in various applications, including in consumer electronics, automotive products, and complex computing systems.

BRIEF DESCRIPTION OF THE DRAWINGS

The following detailed description references the drawings, wherein:

FIG. 1A is a schematic diagram of an example wireless charger;

FIG. 1B is a schematic diagram of an example transmitting coil of the example wireless charger of FIG. 1A generating an electromagnetic field to an example receiving coil;

DETAILED DESCRIPTION

Figure 2:
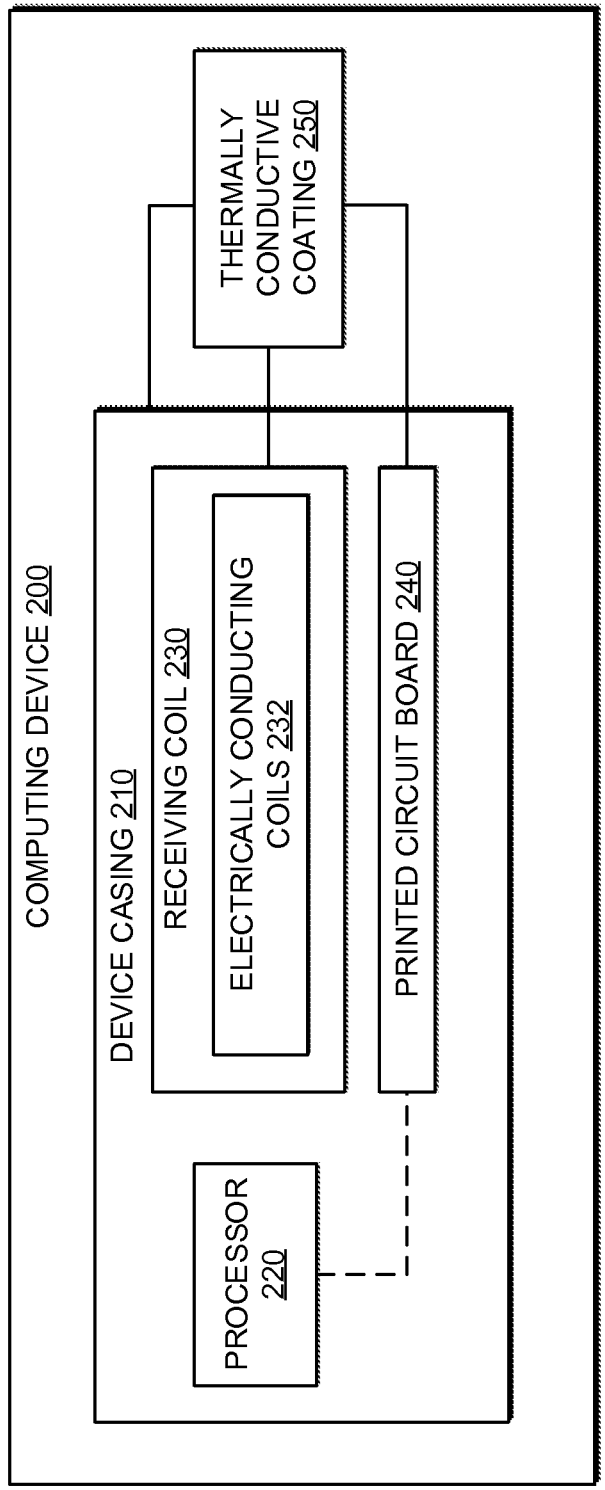
FIG. 2 is a block diagram of an example computing device with a receiving coil.

Convenient, safe, and robust methods and systems for charging electrical systems have been under significant investigation and development due to rapid growth in the electronics and other industries. Wireless charging, or inductive charging, uses electromagnetic fields to transfer energy between a charger and a target being charged. Wireless charging typically involves using a transmitting induction coil to create an electromagnetic field from within a charging base station. Receiving induction coils in the target device then take power from the electromagnetic field and convert it back into electrical current to provide power to the target device, such as to charge the target device's battery.

However, existing wireless charging solutions may present several challenges. Inductive charging may have lower charging efficiency than tradition charging, and may produce increased resistive heating in comparison to direct contact charging. Over time, the produced heat may build and cause the charger, the target device, and their components to heat to reach undesirable temperatures. Excessive heat generation and buildup can cause various issues, such as loss of efficiency, safety concerns, and reduction of product lifetime, leading to increased expenses.

Examples disclosed herein provide for wireless chargers and charging systems with a thermally conductive coating to dissipate heat. Example wireless chargers may include a charger casing, a printed circuit board, and a transmitting coil to induce charging of a target device. A thermally conducive coating is in direct coat with at least one of the transmitting coil, the printed circuit board, and the casing, in order to dissipate heat away from those components. Furthermore, the thermally conductive coating may allow the transmission of electromagnetic fields generated by the transmitting coil to reach, for example, a target device to be charged. In this manner, examples herein provide for versatile heat dissipation in wireless charging systems.

Referring now to the drawings, FIG. 1 depicts a schematic diagram of an example wireless charger 100, which may include a transmitting coil 110 to induce charging of a target device, a charger printed circuit board 120, a charger casing 130, and a thermally conductive coating 140 to dissipate heat. Transmitting coil 110 may include at least one electrically conductive concentric coil. Charger casing 130 may house transmitting coil 110 and charger printed circuit board 120. Thermally conductive coating 140 may be in direct contact with at least one of transmitting coil 110, charger printed circuit board 120, and charger casing 130.

Wireless charger 100 may be an electrical device used to put energy into a secondary cell or rechargeable battery by forcing an electric current through the secondary cell or rechargeable battery. Specifically, for example, wireless charger 100 may be an electrical device that induces the charging of a target device. As further discussed herein in relation to FIG. 1B, wireless charger 100 may generate an electromagnetic field that induces a target device to take the energy from the electromagnetic field and covert the energy back into electrical current for use by the target device. Wireless charger 100 may have variety of designs, and may follow numerous charging protocols.

The charging mechanics of wireless charger 100 may be accomplished by transmitting coil 110, which may induce charging of a target device by converting electrical current into an electromagnetic field. For example, an alternating current driven through the transmitting coil may generate an electromagnetic field. A target device, which is described in further detail in relation to FIG. 2, may be any number of electronic devices with a receiving coil. Transmitting coil 110 may include at least one electrically conductive concentric coil. While FIG. 1 shows one coil, there may be a plurality of concentric coils of varying radii when the same principle is applied. Multiple conducting coils may have the same center and these coils may be helical coils of which wound shape may be a circular or polygonal. Transmitting coil 110 may have a number of electrically conducting materials, including metals such as copper, silver, and aluminum.

Transmitting coil 110 may be operably connected to charger printed circuit board 120, which may provide a mechanical support to house and electrically connect other components to operate wireless charger 110. For example, charger printed circuit board 120 may include processors, circuits, and various other electronic components. Charger casing 130 may be a physical structure that enclose components, including transmitting coil 110 and charger printed circuit board 120. In some implementations, charger casing 130 may protect the interior components of wireless charger 100. Charger casing 130 may have various shapes and sizes and be made of various materials.

During the operation of wireless charger 100, heat may be generated by transmitting coil 110 and other components such as charger printed circuit board 120 and its elements. Thermally conductive coating 140 may be placed in direct contact with at least one of transmitting coil 110, charger printed circuit board 120, and charger casing 130, to dissipate heat. Although FIG. 1A shows thermally conductive coating 140 being on a portion of transmitting coil 110, in some implementations, thermally conductive coating 140 may be on the entirety of transmitting coil 140, and on portions of or all of other components of wireless charger 100. Thermally conductive coating 140 may disperse the heat generated by the components of wireless charger 100 to prevent undesired temperature rises within the charger. In some examples, thermally conductive coating 140 may be in direct contact with each of transmitting coil 110, charger printed circuit board 120, and charger casing 130. For example, thermally conductively coating 140 may be deposited on these components as a film during manufacturing. Furthermore, in some implementations, thermally conductive coating 140 may be on an external surface of casing 130. In such instances, thermally conductive coating 140 may dissipate heat from wireless charger 100 and other objects in contact with wireless charger 100, such as a target device placed on the charger such as during charging.

Thermally conductive coating 140 may include a number of materials and components. For example, thermally conductive coating 140 may include carbon-based materials dispersed in a resin. Carbon-based materials may include diamond-like carbon, graphene, natural graphite, and synthetic graphite coatings. Examples for resins include, but are not limited to: polyimides, acrylonitrile, butadienes, styrenes, polyacetates, polyacrylics, nylon, epoxy, fluoropolymers, Neoprene, polyetherether-ketones, polyethylene terephthalates, phenolics, polycarbonates, polyesters, polyolefins, polystyrenes, polysulfones, polyurethanes, polyvinylchlorides, silicone rubbers, polyetherimides, and low dielectric constant materials. In addition or as an alternative, thermally conductive coating 140 may include metal powders such as aluminum or copper and ceramic powders such as SiC and AiN. In some implementations, thermally conductive coating 140 may allow transmission of electromagnetic fields, which is further discussed herein relation to FIG. 1B.

FIG. 1B depicts a schematic diagram 150 of an example transmitting coil 160 generating an electromagnetic field 165 to an example receiving coil 170. Receiving coil 170 may be part of a target device to be charged. Furthermore, a thermally conductive coating 180 may be placed in direct contact with transmitting coil 180.

When an electrical stimulus, such as a current, is driven through transmitting coil 160, the transmitting coil may generate electromagnetic field 165. When within a certain proximity, receiver coil 170 may receive a portion to all of electromagnetic field 165 and may generate a current to be used by the target device, such as for charging a battery. Further discussion of target devices and receiving coils are found herein relation to FIG. 2.

Thermally conductive coating 180 may be placed on transmitting coil 160 to dissipate heat from the transmitting coil. In other examples, thermally conductive coating 180 may be found elsewhere in or on the charger and, as discussed below, in or on the target device such as on receiving coil 170. As described above, thermally conductive coating 180 may have a variety of materials. In some implementations, thermally conductive coating 180 may be found in the path of electromagnetic wave 165 between transmitting coil 160 and receiving coil 170. Therefore, in some implementations, thermally conductive coating 180 may allow transmission of electromagnetic fields, such as electromagnetic field 170. For example, thermally conductive coating 170 may not significantly block, absorb, deflect, or otherwise alter the path of electromagnetic field 165.

Additionally, transmitting coil 160 may generate an attractive magnetic force when a current is driven through the transmitting coil. This may be a result of the magnetic forces of the electromagnetic field 165 generated by transmitting coil 160. In some implementations, the attractive magnetic force may keep a target device attached to the wireless charger.

FIG. 2 depicts a block diagram of an example computing device 200 with a receiving coil 230. Computing device 200 may have a processor 220, a receiving coil 230, a device printed circuit board 240, a device casing 210, and a thermally conductive coating 250. Receiving coil 230 may have at least one electrically conductive concentric coil and may generate a current to charge computing device 200 when an electromagnetic field is received. Device casing 210 may house processor 220, receiving coil 230, and device printed circuit board 240. Thermally conductive coating 250 may be in direct contact with at least one of receiving coil 230, device printed circuit board 240, and device casing 250, in order to dissipate heat.

Computing device 200 may be, for example, a mobile phone, a notebook computer, a desktop computer, a tablet computer, a server, an automobile, or any other electrical device that may be charged with the wireless charging mechanisms described herein. Processor 220 may be one or more central processing units (CPUs), semiconductor-based microprocessors, and/or other hardware devices suitable to operate computing device 200. In some implementations, processor 220 may be connected to or by device printed circuit board 240. Device printed circuit board may be a mechanical support to house and electrically connect components to operate computing device 200. For example, device printed circuit board 240 may include processors, circuits, and various other electronic components. Processor 220 and the components of device printed circuit board 240 may generate heat during operation.

Receiving coil 230 may provide electrical power to computing device 200 by converting an electromagnetic field into electrical current. For example, the electromagnetic field may be generated by a wireless charger, such as wireless charger 100 of FIG. 1A. Receiving coil 230 may include at least one electrically conductive concentric coil 232. In some implementations, receiving coil 230 may have a plurality of concentric coils 232 of varying radii. Multiple conducting coils may have the same center and these coils may be helical coils of which wound shape may be a circular or polygonal. Transmitting coil 230 may have a number of electrically conducting materials, including metals such as copper, silver, and aluminum.

Receiving coil 230 may be operably connected to device printed circuit board 240, and may, along with processor 220 and device printed board 240, be contained by device casing 210. Device casing 210 may be a physical structure that enclose and protect components of computing device 200. In some implementations, device casing 130 may have various shapes and sizes and be made of various materials.

During charging of computing device 200, heat may be generated by receiving coil 230 and other components such as processor 220 and device printed circuit board 240 and its elements. Thermally conductive coating 250 may be placed in direct contact with at least one of receiving coil 230, device printed circuit board 240, and device casing 210, to dissipate heat. Thermally conductive coating 250 may disperse the heat generated by the components of computing device 200 to prevent undesired temperature rises within the device. In some examples, thermally conductive coating 250 may be in direct contact with each of receiving coil 230, device printed circuit board 240, and device casing 210. For example, thermally conductively coating 250 may be deposited on these components as a film during manufacturing. Furthermore, in some implementations, thermally conductive coating 250 may be on an external surface of device casing 210. In such instances, thermally conductive coating 250 may dissipate heat from computing device 200 and other objects in contact with computing device 200, such as a wireless charger to which computing device is connected.

In some implementations, thermally conductive coating 250 may be made of materials that allow transmission of electromagnetic fields. For example, thermally conductive coating 250 may not significantly block, absorb, deflect, or otherwise alter the paths of electromagnetic wave. Accordingly, thermally conductive coating 250 may not interfere with the wireless charging capabilities of computing device 200 while providing heat dissipation.

Thermally conductive coating 250 may include a number of materials and components. For example, thermally conductive coating 250 may include carbon-based materials dispersed in a resin. Carbon-based materials may include diamond-like carbon, graphene, natural graphite, and synthetic graphite coatings. Examples for resins include, but are not limited to: polyimides, acrylonitrile, butadienes, styrenes, polyacetates, polyacrylics, nylon, epoxy, fluoropolymers, Neoprene, polyetherether-ketones, polyethylene terephthalates, phenolics, polycarbonates, polyesters, polyolefins, polystyrenes, polysulfones, polyurethanes, polyvinylchlorides, silicone rubbers, polyetherimides, and low dielectric constant materials. In addition or as an alternative, thermally conductive coating 250 may include metal powders such as aluminum or copper and ceramic powders such as SiC and AiN.

Figure 3:
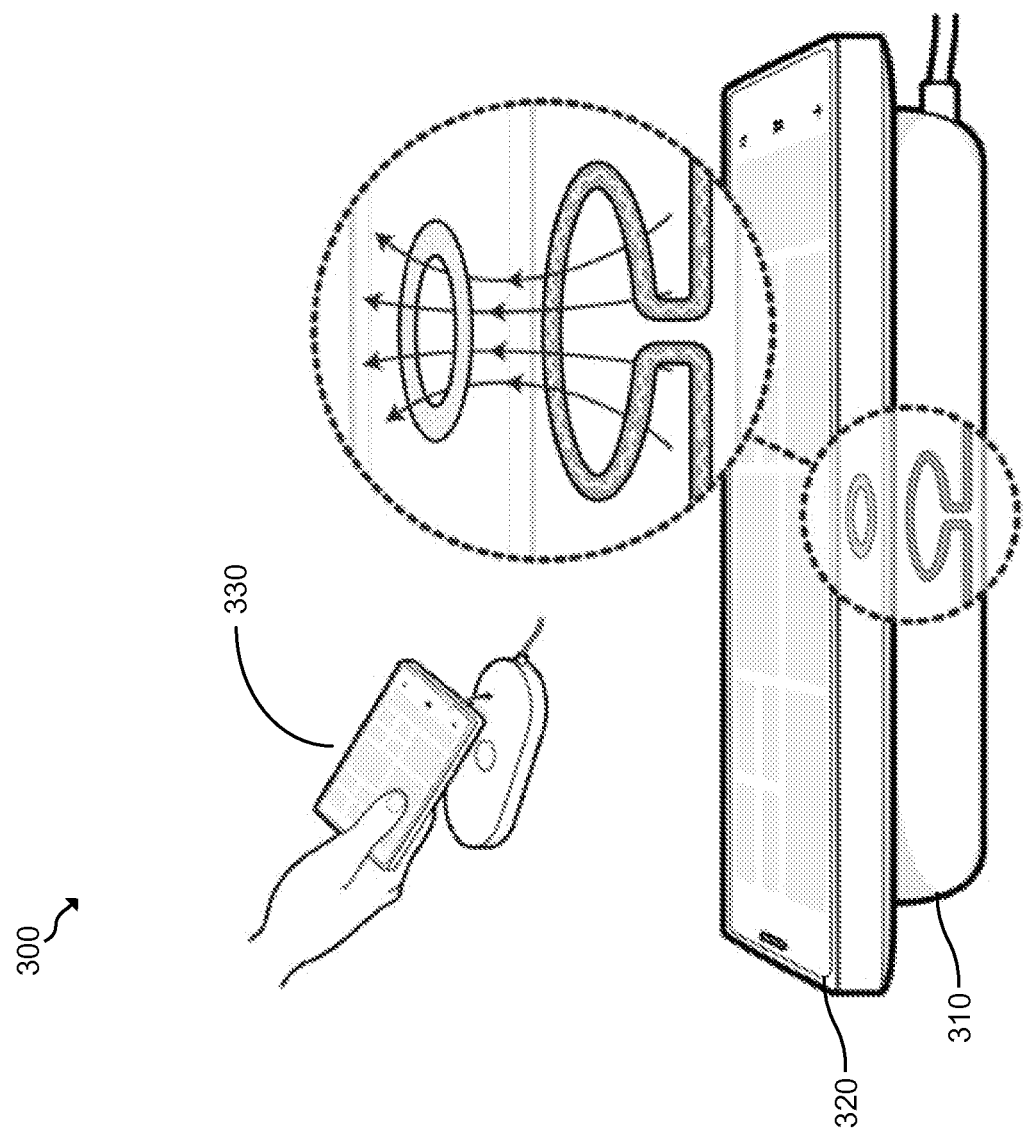
FIG. 3 is a schematic diagram of an example wireless charging system.

FIG. 3 depicts a schematic diagram of an example wireless charging system 300. Wireless charging system 300 may include a wireless charger 310, a target device 320, and a thermally conductive coating to dissipate heat. Wireless charger 310 may include a transmitting coil to induce charging of target device 320, a charger printed circuit board, and a charger casing. Target device 320 may include a processor, a receiving coil to generate a current to charge target device 320, a device printed circuit board, and a device casing. The thermally conductive coating may be in direct contact with at least one of the transmitting coil, the receiving coil, the charger printed circuit board, the device printed circuit board, the device processor, the charger casing, and the device casing.

Wireless charger 310 may be an electrical device that induces the charging of target device 320. As further discussed herein in relation to FIG. 1B, wireless charger 310 may generate an electromagnetic field that induces target device 320 to take the energy from the electromagnetic field and covert the energy back into electrical current. Wireless charger 310 may have variety of designs, and may follow numerous charging protocols. The transmitting coil of may include at least one electrically conductive concentric coil, and the charger casing may house the transmitting coil and the charger printed circuit board. Further details of wireless chargers may be found herein in relation to wireless charger 100 of FIG. 1A.

When an electrical stimulus, such as a current, is driven the through transmitting coil of wireless charger 310, the transmitting coil may generate an electromagnetic field. When within a certain proximity, target device 320 may receive a portion to all of the electromagnetic field and may generate another current to be used by the target device, such as for charging a battery. In some implementations, as illustrated in 330, the transmitting coil may also generate an attractive magnetic force when a current is driven through the transmitting coil. This may be a result of the magnetic forces of the electromagnetic field generated by transmitting coil. In some implementations, the attractive magnetic force may keep target device 320 attached to the wireless charger 310.

Computing device 320 may be, for example, a mobile phone, a notebook computer, a desktop computer, a tablet computer, a server, an automobile, or any other electrical device that may be charged with the wireless charging mechanisms described herein. The receiving coil may provide electrical power to computing device 320 by converting an electromagnetic field into electrical current. For example, the electromagnetic field may be generated by wireless charger 310. The receiving coil may include at least one electrically conductive concentric coil, and the device casing may include the receiving coil, the processor, and the device printed circuit board. Further details of target devices may be found herein in relation to computing device 200 of FIG. 2.

During the operation of charging system 300, heat may be generate by either or both of wireless charger 310 and target device 320. The thermally conductive coating may be placed in direct contact with at least one of receiving coil 230, device printed circuit board 240, and device casing 210, to dissipate heat. The thermally conductive coating may disperse the heat generated by the components of wireless charger 310 and target device 320 to prevent undesired temperature rises in the system. In some examples, the thermally conductive coating may be in direct contact with each of the transmitting coil, the receiving coil, the charger printed circuit board, the device printed circuit board, the charger casing, and the device casing. For example, the thermally conductively coating may be deposited on these components as a film during manufacturing. Furthermore, in some implementations, the thermally conductive coating may be on an external surface of the charger casing or the device casing or both. In such instances, the thermally conductive coating may dissipate heat from wireless charger 310 and computing device 320, as well as other objects in contact with system 300.

In some implementations, portions of the thermally conductive coating may be found in the path of electromagnetic waves propagating between wireless charger 310 and target device 320. Therefore, in some implementations, the thermally conductive coating may allow transmission of electromagnetic fields, such as electromagnetic fields generated by the transmitting coil of wireless charger 310. For example, the thermally conductive coating may not significantly block, absorb, deflect, or otherwise alter the path of electromagnetic fields.

The thermally conductive coating may include a number of materials and components. For example, the thermally conductive coating may include carbon-based materials dispersed in a resin. Carbon-based materials may include diamond-like carbon, graphene, natural graphite, and synthetic graphite coatings. Examples for resins include, but are not limited to: polyimides, acrylonitrile, butadienes, styrenes, polyacetates, polyacrylics, nylon, epoxy, fluoropolymers, Neoprene, polyetherether-ketones, polyethylene terephthalates, phenolics, polycarbonates, polyesters, polyolefins, polystyrenes, polysulfones, polyurethanes, polyvinylchlorides, silicone rubbers, polyetherimides, and low dielectric constant materials. In addition or as an alternative, the thermally conductive coating may include metal powders such as aluminum or copper and ceramic powders such as SiC and AiN.

What is claimed is:
1. A wireless charger, comprising:
a transmitting coil to induce charging of a target device through a receiving coil of the target device, wherein the transmitting coil comprises at least one electrically conductive concentric coil;

a charger printed circuit board;

a charger casing including the transmitting coil and the charger printed circuit board; and a thermally conductive coating to dissipate heat, wherein the thermally conductive coating is in direct contact with and continuously encircles the circumference of the transmitting coil and the thermally conductive coating is partially exposed on an external surface of the charger casing.

2. The wireless charger of claim 1, wherein the thermally conductive coating allows transmission of electromagnetic fields.

3. The wireless charger of claim 1, wherein the transmitting coil generates an electromagnetic field when a current is driven through the transmitting coil.

4. The wireless charger of claim 3, wherein the transmitting coil generates an attractive magnetic force when a current is driven through the transmitting coil.

5. The wireless charger of claim 1, wherein the thermally conductive coating comprises a resin and a carbon-based material dispersed in the resin.

6. The wireless charger of claim 1, wherein the thermally conductive coating comprises at least one of a metallic powder and a ceramic powder.

7. A computing device, comprising:

a processor;

a receiving coil, wherein the receiving coil comprises at least one electrically conductive concentric coil, and wherein the receiving coil generates a current to charge the computing device when an electromagnetic field is applied to the receiving coil;

a device printed circuit board;

a device casing including the processor, the receiving coil, and the device printed circuit board;

and a thermally conductive coating to dissipate heat, wherein the thermally conductive coating is in direct contact with and continuously encircles the circumference of the transmitting coil and the thermally conductive coating is partially exposed on an external surface of the charger casing.

8. The computing device of claim 7, wherein the thermally conductive coating allows transmission of electromagnetic fields.

9. The computing device of claim 7, wherein the thermally conductive coating comprises a resin and a carbon-based material dispersed in the resin.

10. The computing device of claim 7, wherein the thermally conductive coating comprises at least one of a metallic powder and a ceramic powder.

11. A system, comprising:

a wireless charger comprising a transmitting coil to induce charging of a target device through a receiving coil of the target device, a charger printed circuit board, and a charger casing including the transmitting coil and the charger printed circuit board, wherein the transmitting coil comprises at least one electrically conductive concentric coil and wherein the transmitting coil generates an electromagnetic field when a current is driven through the transmitting coil;

the target device comprising a processor, a receiving coil, a device printed circuit board, and a device casing to contain the processor, the receiving coil, and the device printed circuit board, wherein the receiving coil comprises at least one electrically conductive concentric coil and wherein the receiving coil generates a current to charge the target device when the electromagnetic field is applied to the receiving coil; and a thermally conductive film-deposited coating to dissipate heat, wherein the thermally conductive film-deposited coating is in direct contact with and continuously encircles the circumference of the transmitting coil and the thermally conductive coating is partially exposed on an external surface of the charger casing.

12. The system of claim 11, wherein the transmitting coil generates an attractive magnetic force that connects the target device to the wireless charger when a current is driven through the transmitting coil.

13. The system of claim 11, wherein the thermally conductive coating comprises a resin and at least one of a dispersed material dispersed in the resin, wherein the dispersed material includes a carbon-based material, a metallic powder, and a ceramic powder.

14. The system of claim 11, wherein the thermally conductive coating is a film deposited on the at least one of the transmitting coil, the receiving coil, the charger printed circuit board, the device printed circuit board, the device processor, the charger casing, and the device casing during manufacturing.

15. The system of claim 11, wherein the thermally conductive coating is located between the transmitting could and the receiving coil and the thermally conductive coating is made of a material that allows transmission of electromagnetic fields generated from the transmitting coil in an unaltered path to the receiving coil.

* * * * *